April 29, 1941.  L. V. KAIN  2,240,074

STOPCOCK

Filed April 9, 1940

INVENTOR
Lewis V. Kain
BY
ATTORNEY

Patented Apr. 29, 1941

2,240,074

UNITED STATES PATENT OFFICE 2,240,074

STOPCOCK

Lewis V. Kain, Bloomfield, N. J., assignor to William O. Geyer, Bloomfield, N. J.

Application April 9, 1940, Serial No. 328,619

4 Claims. (Cl. 251—112)

This invention relates to stopcocks and more particularly to stopcocks comprised of glass, porcelain and the like ceramic materials.

One of the objects of the present invention is to provide an improved stopcock. Still another object is to provide a stopcock of the ball and socket type. Still another object is to provide a substantially non-freezing stopcock for use with all types and kinds of chemical apparatus for the distribution of all types and kinds of liquid and gaseous reagents therethrough. Other objects and advantages will be apparent as the invention is more fully hereinafter disclosed.

In accordance with these and other objects, I have devised the improved stopcock illustrated in the accompanying drawing, wherein—

Figure 1:
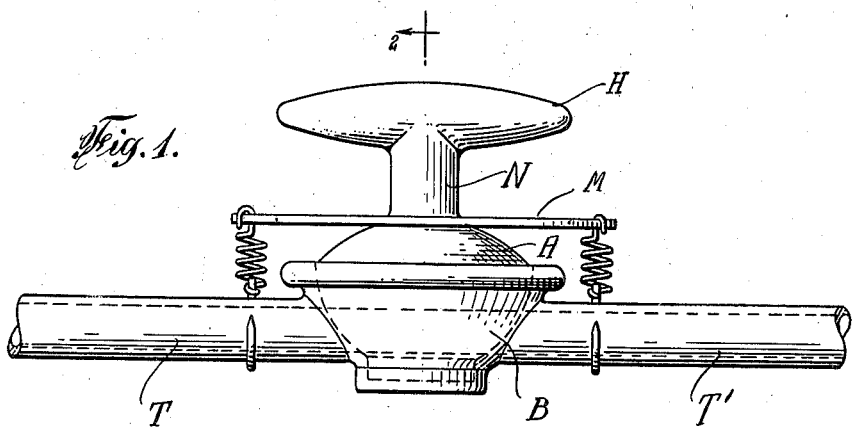
Figure 2:
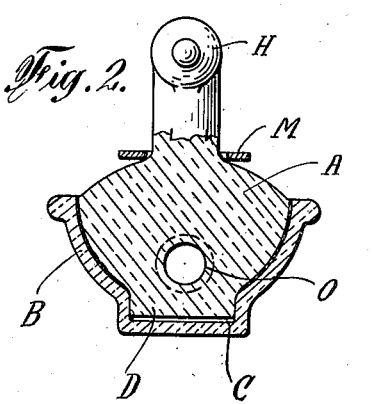
Figure 4:
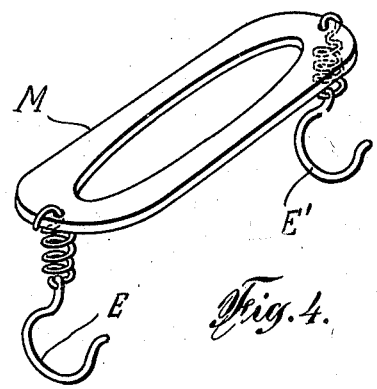
Figure 3:
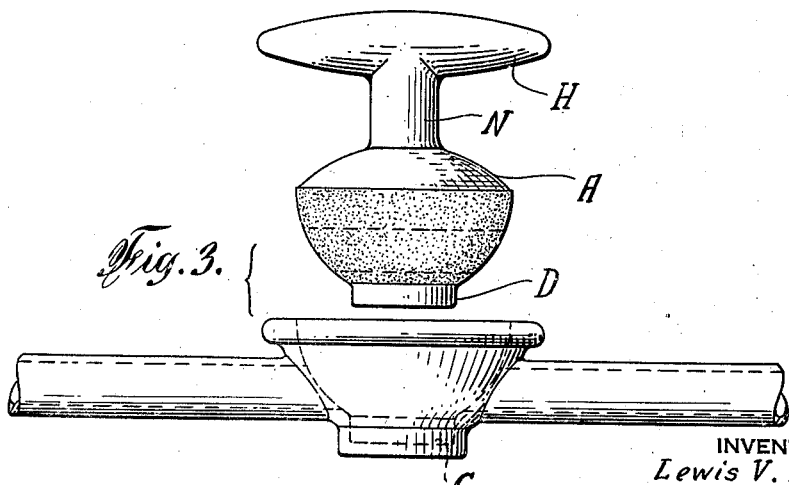

Fig. 1 is a side elevational view of the stopcock of the present invention; Fig. 2 is a sectional view of the same along plane 2—2 of Fig. 1; Fig. 3 is a side elevational view of the stopcock of the present invention with the elements thereof shown in separated relation; and Fig. 4 is a perspective view of the clamp means for use with the stopcock of the present invention.

Referring to the drawing, the stopcock of the present invention comprises cooperating ball and socket members A and B forming the plug and barrel elements, respectively. The bottom of the socket member B is provided with a cylindrical recess C and the bottom of the ball member A is provided with a cylindrical extension D having a diameter approximating but smaller than the diameter of cylindrical recess C.

Ball plug member A may be made in a plurality of shapes without departure from the present invention, it being only essential that the bottom portion thereof be substantially hemispherical in shape while the upper portion thereof may be hemispherical but of slightly less diameter than the bottom portion, or, alternatively, may be shaped as a sector of a hemisphere substantially as shown. Handle H may be of a plurality of shapes rather than the elongated shape indicated and may be connected to the ball portion A by any size or length of neck N desired. Bore opening O in ball plug member A obviously may be of any desired diameter and in any desired location therein without essential departure from the present invention.

Socket or barrel member B may be of any desired exterior size, shape and configuration but preferably is substantially bowl shaped as shown with a hemispherical recess therein having a diameter approximating but larger than the diameter of ball plug member A. Conduits T—T' for conducting fluid (liquid or gaseous) to and from the socket barrel B are sealed to opposite sides of the barrel and open therethrough to the interior hemispherical surface in a position relative to bore O in ball plug member A to align therewith in one position of rotation of the plug A.

To restrain the ball plug A from displacement from operating engagement in socket barrel B clamp means M is provided. Clamp means M comprises substantially a collar M provided at opposite ends with spring hook means E—E' for engaging tube conduits T—T' on opposite sides of the barrel B substantially as indicated, thereby to retain ball A in rotatable sealing position in socket B. This means M may be widely varied without departure from the present invention as one skilled in the art will perceive.

Whereas, as a specific embodiment of the present invention I have illustrated the same as a one-way stopcock comprised of glass, it is believed obvious that the same may be constructed as a two-way, three or four-way stopcock without departing therefrom and may be comprised of any material heretofore employed in the manufacture of stopcocks, such as all kinds of metal and ceramic materials. The engaging ball and socket surfaces of members A and B are preferably ground to a close smooth fit, as indicated, to obtain easy rotatability between the parts.

One of the best advantages to be obtained from the stopcock structure of the present invention is the ready detachability of parts when the stopcock is to be disassembled and the substantial non-freezing characteristics thereof, incident to the ball and socket structure. By the provision of the interengaging cylindrical means D and C on the ball A and socket B, respectively, the disadvantages of unrestricted rotatability of the ball and socket joint is eliminated and rotation is limited about the center axis of the means D—C without substantial effect on the desirable ready detachability features of the joint.

In view of the above description and from the drawing it is believed that the present invention may be widely modified without essential departure therefrom and all such modifications are contemplated as may fall within the scope of the accompanying claims.

What I claim is:

1. In a stopcock a barrel provided with a hemispherical recess, a plug member provided with a hemispherically shaped plug end seating in said recess, an axially aligned cylindrical shaped extension in the bottom of said plug member and a correspondingly axially aligned cylindrical recess in the bottom of said hemispherical recess having a diameter and depth adapted to rotatably receive the said extension, and means to resiliently sustain the said plug in rotatable seating relation to said barrel.

2. The stopcock of claim 1, comprised of glass and wherein the rotatably engaging surfaces of the plug and barrel are ground to a relatively close fit.

3. In a stopcock, a barrel provided with a hemispherical recess having opposite aligned inlet and outlet passageways opening thereto, a plug member having a hemispherical end portion of a diameter adapting the same to be rotatably seated in said barrel recess and having a passageway passing therethrough at right angles to the plug axis at a level aligning the same in one position of rotation of said plug member with the said inlet and outlet passageways in said barrel, an axially aligned cylindrical shaped extension on the bottom of said hemispherical end portion of the said plug member, a cylindrical recess in the bottom of said barrel recess in a position relative to the axis of said plug and plug extension and having a diameter and depth adapted to rotatably receive the said cylindrical extension when the said hemispherical end of the plug member is in seated position in said barrel recess, and means to resiliently retain said plug member in rotatable seated position in said recess.

4. The stopcock of claim 3, comprised of glass, the engaging hemispherical surfaces of said barrel and plug being ground to a relatively close fit.

LEWIS V. KAIN.